United States Patent
Kaminski et al.

(10) Patent No.: US 6,952,070 B1
(45) Date of Patent: Oct. 4, 2005

(54) CAPPED FLAT END WINDINGS IN AN ELECTRICAL MACHINE

(75) Inventors: Christopher Anthony Kaminski, Schenectady, NY (US); Robert John Nygard, Saratoga Springs, NY (US); Sang Woo Lee, Scotia, NY (US); Yu Wang, Clifton Park, NY (US); Anand Shankar Tanavde, Albany, NY (US)

(73) Assignee: General Electric Company, Schenectady, NY (US)

( * ) Notice: Subject to any disclaimer, the term of this patent is extended or adjusted under 35 U.S.C. 154(b) by 2 days.

(21) Appl. No.: 10/834,097

(22) Filed: Apr. 29, 2004

(51) Int. Cl.$^7$ .............................................. H02K 3/46
(52) U.S. Cl. ........................ 310/270; 310/61; 310/64; 310/65
(58) Field of Search .......................... 310/270, 22–64, 310/260, 65

(56) References Cited

U.S. PATENT DOCUMENTS

| | | | | |
|---|---|---|---|---|
| 2,796,540 A | * | 6/1957 | Barlow ........................ 310/61 |
| 4,363,982 A | | 12/1982 | Kaminski .................... 310/61 |
| 4,543,503 A | | 9/1985 | Kaminski et al. ............ 310/59 |
| 4,547,688 A | * | 10/1985 | Hammer et al. .............. 310/59 |
| 4,667,125 A | | 5/1987 | Kaminski et al. ........... 310/214 |
| 4,709,177 A | | 11/1987 | Kaminski .................... 310/59 |
| 4,814,655 A | | 3/1989 | Kaminski .................... 310/260 |
| 5,065,064 A | | 11/1991 | Kaminski .................... 310/215 |
| 5,281,877 A | | 1/1994 | Kazmierczak et al. ........ 310/59 |
| 5,358,432 A | | 10/1994 | Shih et al. ................... 439/825 |
| 5,666,016 A | * | 9/1997 | Cooper ........................ 310/270 |
| 5,886,434 A | | 3/1999 | Nygard ........................ 310/61 |
| 5,929,550 A | | 7/1999 | Kaminski et al. ........... 310/214 |
| 5,986,380 A | | 11/1999 | Kaminski et al. ........... 310/270 |
| 6,081,178 A | | 6/2000 | Wang et al. ................. 335/216 |
| 6,181,228 B1 | | 1/2001 | Laskaris et al. ............. 335/300 |
| 6,194,807 B1 | | 2/2001 | Kaminski et al. ........... 310/270 |
| 6,198,371 B1 | | 3/2001 | Laskaris et al. ............. 335/299 |
| 6,201,462 B1 | | 3/2001 | Laskaris et al. ............. 335/299 |
| 6,239,527 B1 | | 5/2001 | Kaminski et al. ........... 310/168 |
| 6,246,308 B1 | | 6/2001 | Laskaris et al. ............. 335/216 |
| 6,291,919 B1 | | 9/2001 | Ganti et al. ................. 310/261 |
| 6,313,561 B1 | | 11/2001 | Nygard et al. .............. 310/261 |
| 6,339,268 B1 | | 1/2002 | Kaminski et al. ............. 310/61 |
| 6,346,753 B1 | | 2/2002 | Jarczynski et al. ........... 310/53 |
| 6,369,482 B1 | | 4/2002 | Rink, Jr. et al. ............ 310/215 |
| 6,415,613 B1 | | 7/2002 | Ackermann et al. ......... 62/51.1 |
| 6,437,476 B1 | | 8/2002 | Nygard et al. .............. 310/261 |
| 6,438,969 B1 | | 8/2002 | Laskaris et al. ............. 62/51.1 |
| 6,442,949 B1 | | 9/2002 | Laskaris et al. ............. 62/51.1 |
| 6,448,686 B1 | | 9/2002 | Dawson et al. ............. 310/254 |
| 6,495,942 B1 | | 12/2002 | Kaminski et al. ........... 310/262 |

* cited by examiner

*Primary Examiner*—Dang Le
(74) *Attorney, Agent, or Firm*—Nixon & Vanderhye

(57) ABSTRACT

End windings of the field windings of a generator rotor body are flattened. A cap having a flat undersurface overlies the flattened end windings and an enclosure ring extends about the end windings and cap. Apertures are formed through the cap in communication with gaps between the coils of the end windings and passageways formed along the outer surface of the cap. The passageways and apertures form ventilation paths for a cooling medium flowing through the end windings outwardly into the air gap between the rotor body and stator.

15 Claims, 4 Drawing Sheets

CAPPED FLAT END WINDINGS IN AN ELECTRICAL MACHINE

BACKGROUND OF THE INVENTION

The present invention relates generally to electrical machines of the type having a rotor and field windings, including end windings about a rotor body, and particularly relates to flattened end windings across the width of a pole in conjunction with a cap affording cooling medium flow ventilation radially outwardly of the end windings.

In electrical machines, for example, generators, there is provided a rotor body having field windings which generally form arcs at opposite ends of the rotor body and are called end windings. The end windings typically extend generally axially from the rotor body and cross over supports or spindles in a circumferential direction adjacent opposite ends of the body for return in an axial direction into and along the rotor body. In a typical generator construction, the windings are located in slots in the rotor body and wedges secure the windings in the slots. The end windings are typically separated from one another by spacer blocks. More recent generators include a rotor body having defined pole regions with pole faces and parallel sides, together with prefabricated winding modules extending along the parallel sides with the prefabricated end windings extending between end faces of the rotor body. In both types of generator constructions, the end windings extend arcuately about the supports or spindles at opposite ends of the rotor body. A retaining or enclosure ring conventionally overlies the end windings forming essentially a cylindrical ring about the end windings.

It will be appreciated that the field windings, including the end windings, are cooled by passing a cooling medium through or along the rotor windings. Typically, grooved passages are formed in the field windings internal to the copper and channel the cooling medium so that it can be discharged radially outwardly into the gap between the rotor and stator and axially inwardly of the end retaining or enclosure rings. Thus, the end retaining or enclosure rings serve as obstructions to the discharge of the cooling medium channels through the rotor end windings.

BRIEF DESCRIPTION OF THE INVENTION

In accordance with a preferred aspect of the present invention, there is provided an end winding arrangement for the field windings of the rotor of an electrical machine where the end windings are generally flattened across the width of the pole. To facilitate cooling of the end windings, a cap overlies the generally flattened surfaces of each end winding and is provided with at least one passage for flowing cooling gas from between the spaced end windings through the cap to the gap between the rotor and the stator of the electrical machine.

More particularly, each end cap is provided with at least one, and preferably a plurality of axially extending passageways along the arcuate outer surface in communication with one or more apertures opening through the inside flat face of the cap into the gaps between the turns of the end windings. The axial passageways open axially beyond the end enclosure ring and the cooling medium thus flows radially outwardly from the end windings through the apertures and axial passages to exit in the gap between the rotor body and stator. Internal cooling grooves typically used in the coils of the end windings for cooling purposes are eliminated. Further, more uniform end winding temperatures are obtained by introducing these shorter ventilation paths. Closer spacing of the rotor end winding coils improves convective heat transfer and enables construction of electrical machines with a shorter footprint. Moreover, the cooling medium is transferred from the end windings without penetrating or forming holes through the retaining or enclosure ring. It will also be appreciated that the flattened end winding coils and the end caps can be employed on the CFRE (carbon fiber rotor enclosure) type generator, as well as a conventional generator having windings disposed in slots in the rotor body with wedges maintaining the windings within the body.

In a preferred embodiment according to the present invention, there is provided an end winding arrangement for the field windings of a rotor in an electrical machine, comprising a plurality of end windings extending from a pole of the rotor and spaced from one another, the end windings forming generally flattened surfaces across the width of the pole, a cap overlying the generally flattened surfaces and having at least one passage for flowing cooling gas from between the spaced end windings through the cap to a gap between the rotor and a stationary portion of the electrical machine.

DETAILED DESCRIPTION OF THE INVENTION

Figure 1:
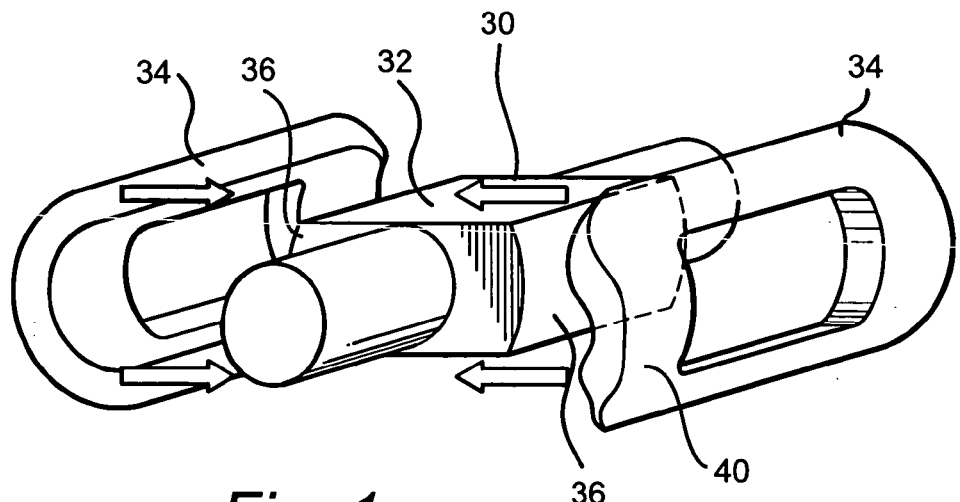
FIG. 1 is a perspective view of a CFRE rotor in an electrical machine exemplifying constituent elements of the machine.

As illustrated in drawing FIG. 1, a generator rotor 30 includes a multi-pole magnetic core 32 (a two-pole core being shown) and a plurality of winding assemblies 34, one for each pole, and corresponding pole faces 36. The construction and materials of the magnetic core 32 and winding assemblies 34 are known. The prefabricated winding assemblies 34 are disposed over the parallel side forging, forming a rotor body, and are curved in an arc generally concentric with the rotor body. While not illustrated, it will be appreciated that the rotor is disposed within a stator, not shown, and an air gap exists between the inner surface of the stator and the outer surface of the rotor. The generator rotor illustrated in FIG. 1 has end windings 40 which, in final assembly of the rotor body, extend arcuately over the spindles at opposite ends of the rotor. The foregoing-described rotor body is a carbon fiber rotor enclosure (CFRE) which has various advantages in contrast to prior conventional generators which typically have field windings disposed in axially extending slots in the rotor body with wedges disposed in the slots, maintaining the field windings in the slot. Similarly as with the CFRE rotor body, the conventional field windings include end windings which extend arcuately over the spindles or axles at opposite ends of the rotor body.

Figure 2:
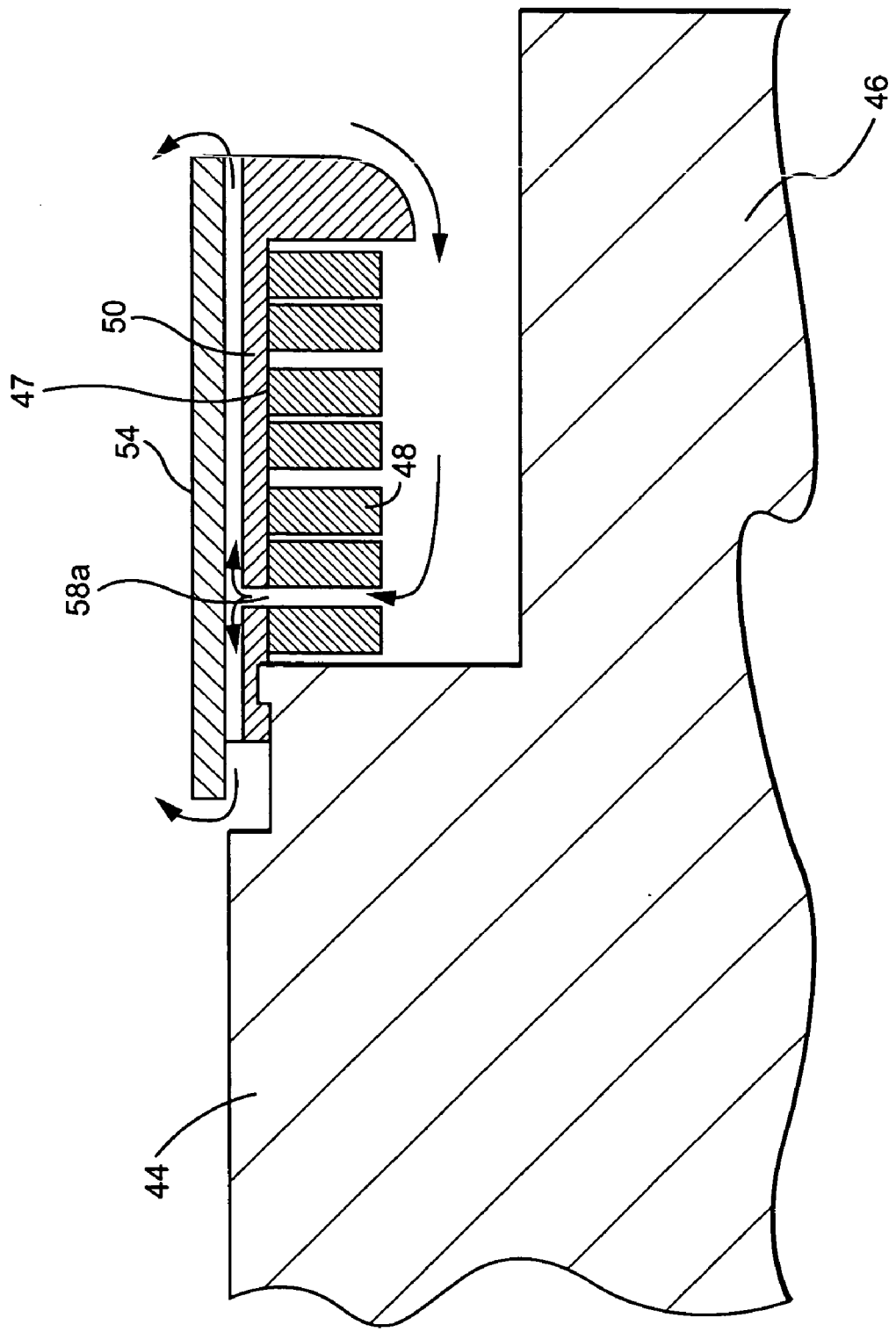
FIG. 2 is an enlarged fragmentary cross-sectional view of the end windings for the rotor including an end cap in accordance with a preferred embodiment of the present invention.
Figure 4B:
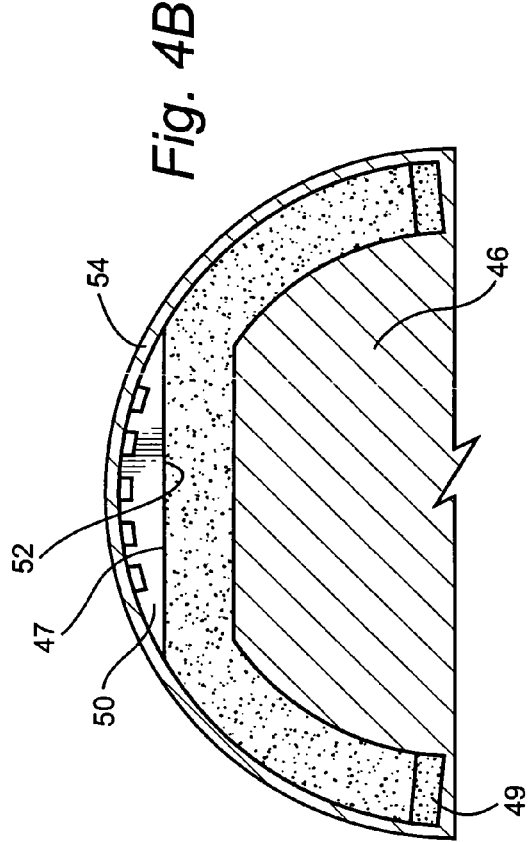
FIGS. 4B and 4D are cross-sectional views through the end windings illustrating the largest and smallest coils in the end winding region, respectively, in conjunction with end caps of the present invention.
Figure 4D:
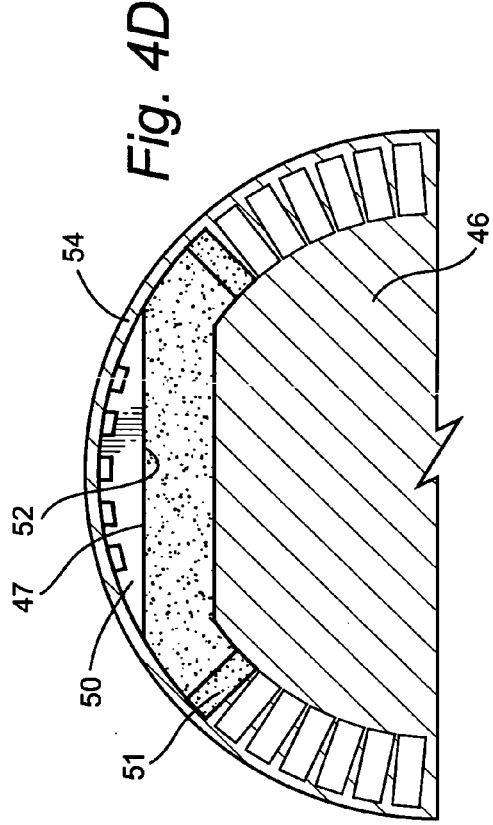
Figure 4A:
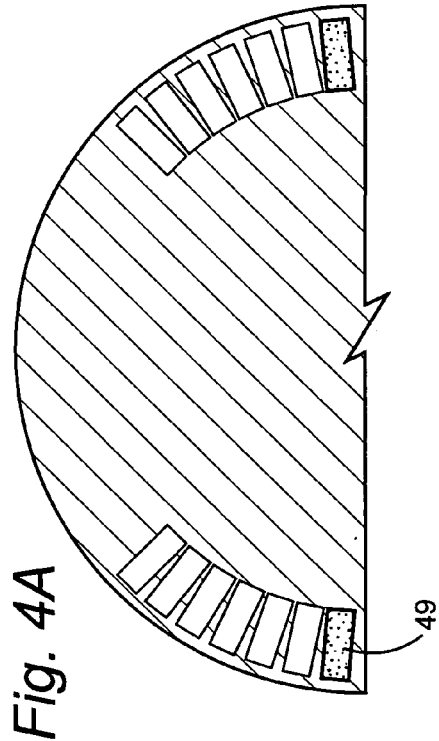
FIGS. 4A and 4C are cross-sectional views through the body illustrating the largest and smallest coils in the rotor body, respectively.
Figure 4C:
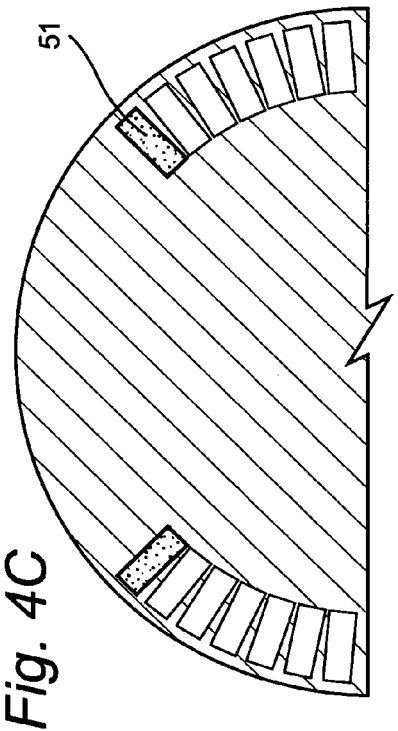
Figure 5B:
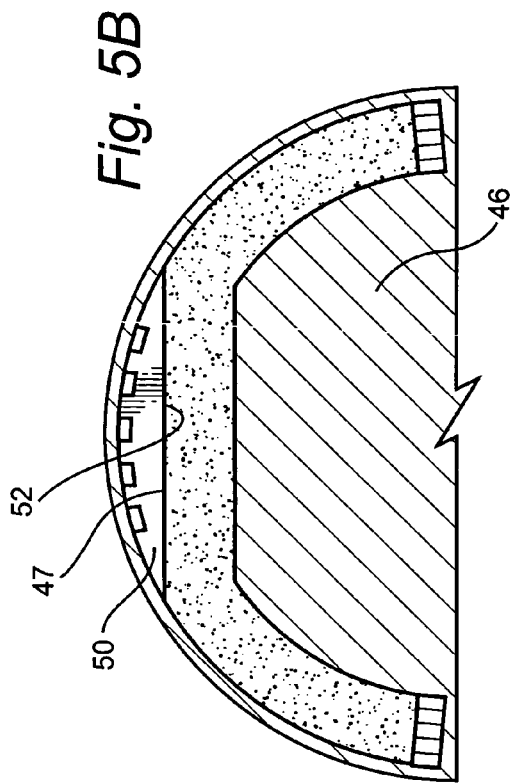
FIGS. 5B and 5D illustrate the largest and smallest end windings in conjunction with end caps of the present invention.
Figure 5D:
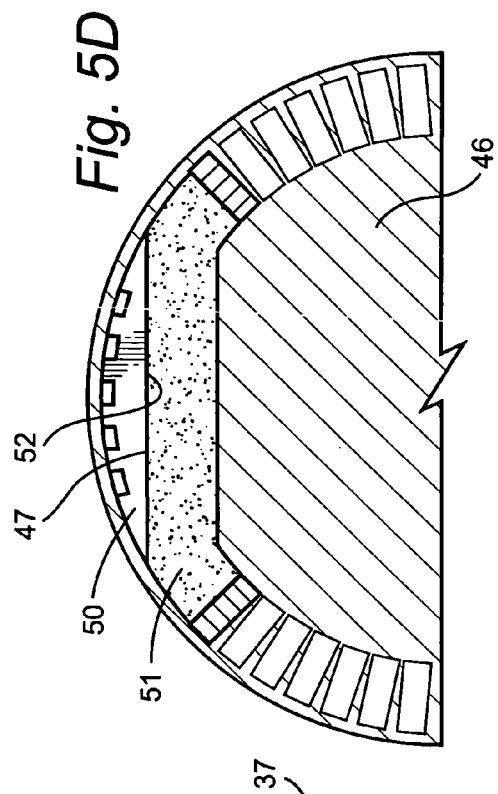
Figure 5A:
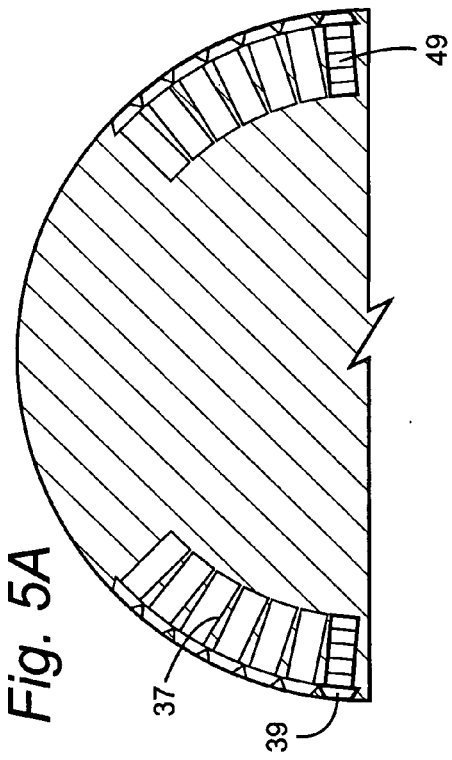
FIGS. 5A and 5C are views similar to FIGS. 4A and 4C illustrating the largest and smallest coils of a conventional field winding arrangement in a rotor body.
Figure 5C:
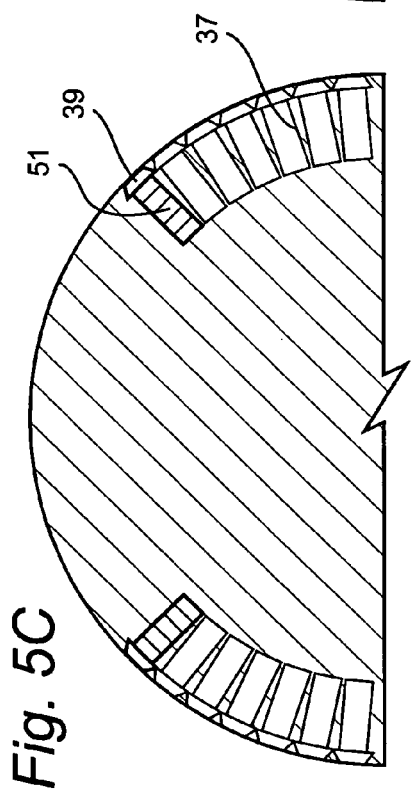

Per FIG. 2, there is illustrated a rotor body 44 with an end spindle 46. End windings 48, forming part of the field windings for the generator of which the rotor body forms a part, are illustrated. Instead of extending entirely arcuately over the spindle 46 as in the prior art described above, the end windings 48 are flattened along their outer surfaces 47 (FIGS. 2 and 4B) and extend linearly over a major portion of the span across the rotor body and between the end winding portions which extend axially into the rotor body. FIGS. 4B and 4D illustrate the flattened end windings for the largest and smallest of the coils of the end windings 49 and 51, respectively. It will be appreciated that the end windings of the prefabricated field windings, for example, of a rotor body of a generator of the type illustrated in FIG. 1 or the more conventional generator rotor having field windings maintained in rotor body slots 37 by wedges 39 as illustrated in FIGS. 5A–5D hereof are flattened at 47. In either case, as illustrated in FIGS. 4B, 4D, 5B and 5D, the arcuate end windings are in part flattened at 47 as they extend across the rotor body.

Figure 3:
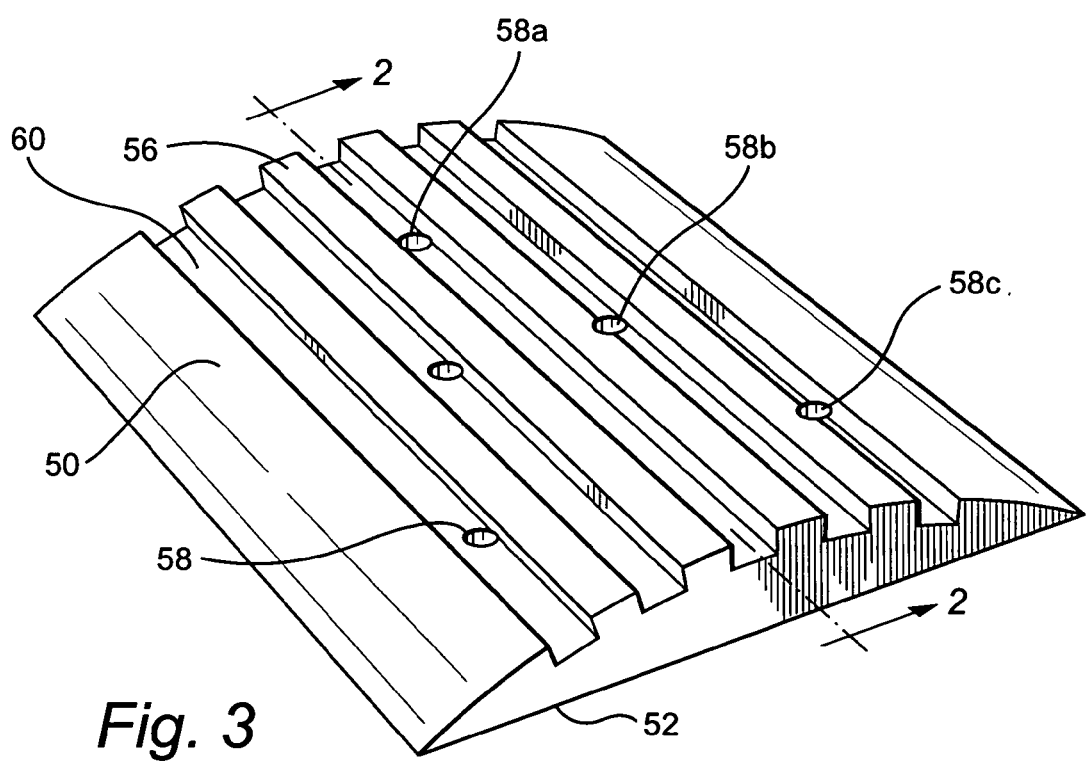
FIG. 3 is a perspective view of the end cap.

In accordance with a further aspect of the present invention, an end cap 50 overlies the flattened portions 47 of the end windings. As illustrated in FIGS. 3 and 4B, the inside surface 52 of the end cap 50 is flat and parallels the flattened or linear portion 47 of the end windings. The outer surface of the cap 50 conforms to the cylindrical shape of the rotor body. As illustrated in FIG. 2, an annular retainer or enclosure ring 54 overlies the end windings and particularly overlies the end caps 50. The flat undersurface 52 of the cap 50 forms a plane extending parallel to the plane of the flattened outer surfaces 47 of the end windings.

To ventilate the end windings, the cooling medium flows generally outwardly into the air gap between the rotor body and the stator without passing back through the rotor body and without using the end windings per se as conduits for the cooling medium. To accomplish this, each end cap 50 includes a plurality of apertures 58 (FIG. 3) extending between its flat underside 52 and its arcuate outer side 56 underlying the enclosure 54. Additionally, a plurality of passageways 60, e.g., grooves, are formed along the outer surface 56 of the cap 50 extending generally parallel to the axis of rotation of the rotor body. The apertures 58 extend from the undersurface 52 through the cap and open into the passageways 60 at specified locations therealong.

As illustrated in FIG. 2, one or more apertures 58 are located through the cap 50 dependent upon the location of the gap between end windings in an axial direction. That is, means are provided for increasing the flow of cooling air between pairs of adjacent coils having lengths in excess of other pairs of adjacent coils. For example, as illustrated upon a comparison of FIGS. 2 and 3, the aperture 58a closest axially to the rotor body lies in communication between the coils of the first pair of end windings closely adjacent the pole face of the rotor body. Gaps between the coils of end windings spaced further axially from the end of the rotor body are ventilated by additional apertures. Thus, apertures 58b (FIG. 3) lie in communication with the grooves 60 and with the gaps between coils further axially spaced from the end of the rotor body. Apertures 58c lie in communication with the largest coils of the end windings to ventilate those coils into a pair of grooves 60. As illustrated in FIG. 2, the passageways 60 communicate at opposite ends with the air gap between the rotor body and the stator. Also, as illustrated in FIGS. 4B and 4D, the coils of the end windings are shortened by the flattening thereof. It will thus be appreciated that the end cap ventilation arrangement transfers cooling medium without requiring penetration of the retaining ring 54 or creating openings in the coils of the end windings per se and enhances cooling performance.

As illustrated in FIGS. 5A–5D, the end cap 50 is applicable also to the end windings of a conventional generator. In such a generator, the field windings lie in axial slots 37 in the rotor body and are retained in those slots by wedges 39. The field coils extend similarly as described above to form flattened end windings. The end caps 50 overlie the flattened portions of the end windings and similarly provide ventilation paths for the cooling medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An end winding arrangement for the field windings of a rotor in an electrical machine, comprising:
   a plurality of end windings extending axially from the rotor and spaced circumferentially from one another, said end windings having axially spaced, linearly extending portions forming generally flattened outer end winding surfaces across a chordwise extent of the rotor and
   a cap overlying the generally flattened surfaces and having at least one passage for flowing cooling gas from between the circumferentially spaced end windings through the cap to a gap between the rotor and a stationary portion of the electrical machine.

2. An arrangement according to claim 1 wherein said cap has at least one axially extending passageway along an outer surface thereof forming part of said flow passage.

3. An arrangement according to claim 1 wherein said flow passage includes an aperture extending through the cap from a radial inside surface thereof to a radially outer surface thereof.

4. An arrangement according to claim 3 wherein said cap includes at least one axially extending passageway along an outer surface thereof in communication with said aperture.

5. An arrangement according to claim 1 wherein said cap includes a plurality of circumferentially spaced, axially extending passageways and a plurality of apertures extending from a radial inside surface of said cap in communication with spaces between the end windings and said passageways, respectively, said apertures and said passageways forming passages for flowing cooling gas from between the axially spaced end winding portions through the cap to the gap.

6. An arrangement according to claim 1 wherein said end windings include coils of different lengths, and means for increasing the flow of cooling gas through the cap from between a first axially adjacent pair of coils having lengths in excess of the lengths of a second pair of coils relative to the flow of cooling gas through the cap between said second pair of coils.

7. An arrangement according to claim 1 wherein said cap includes a plurality of circumferentially spaced, axially extending passageways and a plurality of apertures extending from a radial inside surface of said cap in communication with spaces between the end windings and said passageways, respectively, said apertures and said passageways forming passages for flowing cooling gas from between the spaced end windings through the cap to the gap, said end windings including coils of different lengths, and means for increasing the flow of cooling gas through the cap from between a first axially adjacent pair of coils having lengths in excess of the lengths of a second pair of coils relative to the flow of cooling gas through the cap between said second pair of coils.

8. An arrangement according to claim 7 wherein said means includes at least a pair of apertures in communication with the gap between the first pair of coils and with respective axially extending passageways.

9. An arrangement according to claim 1 wherein said machine includes a rotor body having a plurality of radial slots and a plurality of coils in said radial slots and extending therefrom to form said end windings.

10. An arrangement according to claim 1 wherein said machine includes a rotor body having defined pole regions with pole faces and sides adjacent the pole faces and prefabricated winding assemblies having sequential field windings within the assemblies extending along the sides of the rotor body and extended to form said end windings.

11. An arrangement according to claim 1 wherein the cap includes a flat undersurface for overlying the generally flattened outer end winding surfaces.

12. An arrangement according to claim 1 wherein the cap has a circumferential extent about the rotor no greater than the circumferential extent of the rotor.

13. An end winding arrangement for the field windings of a rotor in an electrical machine, comprising:

a plurality of end windings extending from a pole of the rotor and spaced from one another, said end windings forming generally flattened surfaces across the width of the pole; and a cap overlying the generally flattened surfaces and having at least one passage for flowing cooling gas from between the spaced end windings through the cap to a gap between the rotor and a stationary portion of the electrical machine, said passageways comprising grooves formed along the outer surface of the cap.

14. An arrangement according to claim 13 wherein the grooves open through opposite ends of the cap.

15. An arrangement according to claim 13 including a retaining ring about the end windings and end cap.

* * * * *